United States Patent
Harayama et al.

(10) Patent No.: US 9,461,279 B2
(45) Date of Patent: Oct. 4, 2016

(54) BATTERY

(71) Applicants: Takashi Harayama, Toyota (JP);
 Kazuyuki Kusama, Nagoya (JP);
 Katsumi Ogawa, Toyonaka (JP); Isao Awai, Toyonaka (JP); Hiroyuki Torii, Koka (JP)

(72) Inventors: Takashi Harayama, Toyota (JP);
 Kazuyuki Kusama, Nagoya (JP);
 Katsumi Ogawa, Toyonaka (JP); Isao Awai, Toyonaka (JP); Hiroyuki Torii, Koka (JP)

(73) Assignees: TOYOTA JIDOSHA KABUSHIKI KAISHA, Toyota-Shi (JP);
 YODOGAWA HU-TECH CO., LTD, Osaka-Shi (JP)

(*) Notice: Subject to any disclaimer, the term of this patent is extended or adjusted under 35 U.S.C. 154(b) by 20 days.

(21) Appl. No.: 14/409,204

(22) PCT Filed: Jun. 19, 2013

(86) PCT No.: PCT/JP2013/066853
 § 371 (c)(1),
 (2) Date: Dec. 18, 2014

(87) PCT Pub. No.: WO2014/002847
 PCT Pub. Date: Jan. 3, 2014

(65) Prior Publication Data
 US 2015/0140415 A1  May 21, 2015

(30) Foreign Application Priority Data

Jun. 25, 2012 (JP) ................. 2012-141717

(51) Int. Cl.
 *H01M 2/08* (2006.01)
 *H01M 2/06* (2006.01)
 *H01M 2/30* (2006.01)

(52) U.S. Cl.
 CPC ................. *H01M 2/08* (2013.01); *H01M 2/06* (2013.01); *H01M 2/30* (2013.01)

(58) Field of Classification Search
 CPC ............................. H01M 2/08; H01M 10/052
 See application file for complete search history.

(56) References Cited

U.S. PATENT DOCUMENTS 4,333,995 A * 6/1982 Ishida ..................... H01M 2/08
                                                    429/172
2006/0204842 A1* 9/2006 Cho ...................... H01M 2/021
                                                    429/181

FOREIGN PATENT DOCUMENTS

| JP | H1116548 A | 1/1999 |
| JP | 2002175797 A | 6/2002 |
| JP | 3916728 B2 | 5/2007 |
| JP | 2010-153167 A | 7/2010 |
| JP | 2012-028246 A | 2/2012 |

* cited by examiner

*Primary Examiner* — Stewart Fraser
*Assistant Examiner* — Olatunji Godo
(74) *Attorney, Agent, or Firm* — Kenyon & Kenyon LLP

(57) ABSTRACT

A battery sealing member: has a power generating element, a case body member, a case lid member, and an electrode terminal member having an insert-through part inserted in a through-hole provided in the case lid member. The electrode terminal member is electrically connected to the power generating element. The battery sealing member is made of a synthetic resin and has a sealing part held between the electrode terminal member and the inner surface of the case lid member. The crystallinity of the sealing part of the sealing member is higher than the crystallinity of a portion other than the seal section.

10 Claims, 11 Drawing Sheets

BATTERY

CROSS-REFERENCE TO RELATED APPLICATIONS

This is a US national phase application based on the PCT International Patent Application No. PCT/JP2013/066853 filed on Jun. 19, 2013, and claiming the priority of Japanese Patent Application No. 2012-141717, filed on Jun. 25, 2012, the entire contents of which are herewith incorporated by reference.

TECHNICAL FIELD

The present invention relates to a battery sealing member to be used in a battery including an electrode terminal member electrically connected to a power generating element inside a case lid member and extended out by penetrating the case lid member, the sealing member being configured to seal between the electrode terminal member and the case lid member.

BACKGROUND ART

In recent years, batteries such as lithium ion secondary batteries are used in various fields, for example, electronic devices such as a mobile phone and a personal computer, vehicles such as a hybrid vehicle and an electric vehicle. In particular, the lithium ion secondary battery has high energy density and thus is suitable for various devices.

For example, the lithium ion secondary battery is configured as below. The lithium ion secondary battery includes a power generating element of a flattened shape formed of a positive electrode foil applied with positive active material, a negative electrode foil applied with negative active material, and separators insulating them, which are wound together. The power generating element is enclosed in a case body member having an opening. This opening is closed by a case lid member welded to the case body member. To the power generating element, an electrode terminal member is electrically connected. The electrode terminal member includes for example an element connecting terminal electrically connected to the power generating element and extended out by penetrating through the case lid member, and an outer connecting terminal electrically connected to the element connecting terminal outside the case lid member. The case lid member is provided with a liquid inlet through which an electrolyte is poured. After pouring the electrolyte, the liquid inlet is closed with a plug. This plug is sealingly welded to the case lid member by laser welding.

Herein, a sealing member (a gasket) made of synthetic resin is provided between the element connecting terminal of the electrode terminal member and the case lid member to seal between them. As a battery using a gasket to seal between the element connecting terminal of the electrode terminal member and the case lid member, there is known a lithium ion secondary battery disclosed for example in Patent Document 1 listed below. In the secondary battery disclosed in Patent Document 1 includes, as shown in FIGS. 4 and 5 and paragraph 0017, an element connecting terminal (a positive current collector 14 and a positive connecting terminal 15 in Patent Document 1) includes an insert-through part (a shaft part 15a in Patent Document 1) inserted in a through hole formed through the case lid member (a lid 11 in Patent Document 1) to protrude out of the case lid member and a flat plate part (a head part 15f in Patent Document 1) having a larger diameter than the insert-through part. The element connecting terminal is inserted in the through hole of the case lid member while the gasket is fitted in the insert-through part. Specifically, the gasket is formed therethrough with an insert-through hole (a through hole 10a in Patent Document 1). The element connecting terminal is placed so that the insert-through part is inserted in the insert-through hole and extends through the through hole of the case lid member from a lower surface side of the case lid member. Furthermore, an outer insulating member (an insulating member 12 in Patent Document 1) and an outer connecting terminal (a positive outer terminal 13 in Patent Document 1) are fitted on the insert-through part exposed out of the case lid member and also a tip end of the insert-through part is deformed or riveted by rotary caulking to thereby fasten each member to the case lid member. At that time, the gasket is pressed against the inner surface of the case lid member by the flat plate part. Accordingly, the power connecting terminal and the gasket are placed in surface contact without gaps and the case lid member and the gasket are placed in surface contact without gaps. This ensures sealing between the power connecting terminal and the case lid member and thus can prevent leakage of the electrolyte from the inside of the case body member to the outside of the case lid member.

RELATED ART DOCUMENTS

Patent Documents

Patent Document 1: JP-A-2012-28246

SUMMARY OF INVENTION

Problems to be Solved by the Invention

However, for the battery in Patent Document 1, crystallinity (crystallization degree) and specific gravity of the gasket made of synthetic resin have not been taken into consideration. In a case of using a gasket having a low crystallinity, the electrolyte (in particular, vaporized electrolyte) in the case body member may penetrate into the gasket, passing through the gasket to leak out of the case lid member. Even in a case of using a gasket having a high crystallinity, the crystallinity of the gasket decreases by exposure to heat as an environmental temperature of a battery increases. This case also may cause the electrolyte to penetrate into the gasket as in the case of using the low-crystallinity gasket.

Herein, the crystallinity represents a ratio of a crystalline area to total area of the polymer substance consisting of the crystalline area and a non-crystalline area. If the crystallinity of the gasket is high, the free volume in the gasket is small. This does not allow molecules of the electrolyte to enter the gasket. Even if the molecules enter the gasket, they are dispersed slowly in the gasket. On the other hand, if the crystallinity of the gasket is low, the free volume in the gasket is large. This allows molecules to enter the gasket and spread or disperse in the gasket at high speeds. The free volume in the gasket represents a value obtained by subtracting the volume of molecules existing in the entire volume of the gasket. That is, it represents a region allowing penetration of molecules.

In the case of the gasket with a low crystallinity, as mentioned above, the electrolyte may penetrate into and pass through the gasket and then leak out of the case lid member. In particular, a battery mounted in a vehicle will be exposed to sharp changes in usage environmental temperature. When the usage environmental temperature rises, therefore, the crystallinity of the gasket exposed to heat decreases, which is more likely to cause penetration of the electrolyte into the gasket.

The present invention has been made to solve the above problems and has a purpose to provide a battery sealing member capable of appropriately preventing leakage of an electrolyte out of a case lid member.

Means of Solving the Problems

To achieve the above purpose, one aspect of the invention provides a battery sealing member to be used in a battery including: a power generating element; a case body member having an opening and enclosing the power generating element together with an electrolyte; a case lid member closing the opening of the case body member; and an electrode terminal member having an insert-through part inserted in a through hole provided in the case lid member, the electrode terminal member being electrically connected to the power generating element, the sealing member being made of synthetic resin and including a sealing part held between the electrode terminal member and an inner surface of the case lid member, wherein the sealing part has a crystallinity higher than a crystallinity of a portion other than the sealing part. It is to be noted that the "sealing part" represents a part held or clamped between the electrode terminal member and the inner surface of the case lid member and hence subjected to compression force. The "power generating element" may be any one of a wound power generating element including a positive electrode, a negative electrode, and separators, each of which has a long shape, overlapped and wound together, a laminated power generating element including a plurality of positive electrodes, a plurality of negative electrodes, and a plurality of separators, each of which has a predetermined shape, stacked in layers, and others.

According to the battery sealing member configured as above, the seal part has a high crystallinity and thus the sealing part provides high density. This makes it hard for molecules constituting the electrolyte to permeate into the sealing part. Accordingly, it is possible to prevent the electrolyte from passing through the inside of the sealing member and leaking out of the battery.

In the battery sealing member configured as above, preferably, the crystallinity of the sealing part is 40% or more. This is because when the sealing part has a crystallinity of 40% or more, the sealing part can appropriately prevent leakage of the electrolyte out of the battery.

The battery sealing member configured as above, preferably, further includes an insert-through hole in which the insert-through part will be inserted, wherein the battery sealing member includes: an inner edge part located on an inner side close to the insert-through hole relative to the sealing part and formed to surround the insert-through hole; the sealing part surrounding the inner edge part; and an outer edge part located on an outer side opposite to the inner edge part relative to the sealing part and formed to surround the sealing part, and the sealing part is higher in crystallinity than the inner edge part and the outer edge part.

Even when the usage environmental temperature of the battery rises, the above configuration can prevent a decrease in crystallinity of the sealing part and maintain a good sealing performance or strength by the battery sealing member. Specifically, the above battery sealing member is configured so that the sealing part having a high crystallinity is interposed between the inner edge part and the outer edge part each having a low crystallinity. If the battery sealing member is warmed, a crystalline region of the sealing part attempts to transform into a non-crystalline region and accordingly the sealing part attempts to expand. However, the inner edge part and the outer edge part lower in crystallinity than the sealing part are conceived as having already expanded as compared with the sealing part. Thus, they cannot absorb the expansion of the sealing part. The force of the sealing part that attempts to expand acts on the inner edge part and the outer edge part, but is not so large as to constrict the inner and outer edge parts. Accordingly, the expansion of the sealing part is suppressed. The battery sealing member configured as above can prevent deterioration in crystallinity of the sealing part and maintain the crystallinity of the sealing part at a higher value than those of the inner edge part and the outer edge part. This enables the battery sealing member to maintain the good sealing performance.

If the sealing member is configured such that the inner edge part, the outer edge part, and the sealing part uniformly have a high crystallinity without providing a difference from each other, the expansion of the sealing part caused as the usage environmental temperature of the battery rises is absorbed by the inner edge part and the outer edge part. This deteriorates the crystallinity of the sealing part, which cannot ensure good sealing performance by the sealing member.

In the battery sealing member configured as above, preferably, the inner edge part includes at least a portion that will be inserted together with the insert-through part in the through hole of the case lid member. With the above configuration, the inner edge part of the battery sealing member can close the through hole of the case lid member, thus enhancing the hermeticity with the case lid member and the electrode terminal member.

In the battery sealing member configured as above, preferably, the sealing member will be used in the battery including the electrode terminal member provided with a flat plate part between which and the inner surface of the case lid member the sealing part will be held, the insert-through part being extended vertically from a main surface of the flat plate part, and the outer edge part is configured to surround a peripheral surface of the flat plate part continuous with the main surface.

With the above configuration, the battery sealing member can be fitted on the electrode terminal member so that the outer edge part of the sealing member surrounds the peripheral surface of the flat plate part of the electrode terminal member. This facilitates positioning of the sealing member with respect to the electrode terminal member during assembling.

Effects of the Invention

According to the invention, it is possible to provide a battery capable of suitably preventing leakage of an electrolyte out of a case lid member.

MODE FOR CARRYING OUT THE INVENTION

Figure 1:
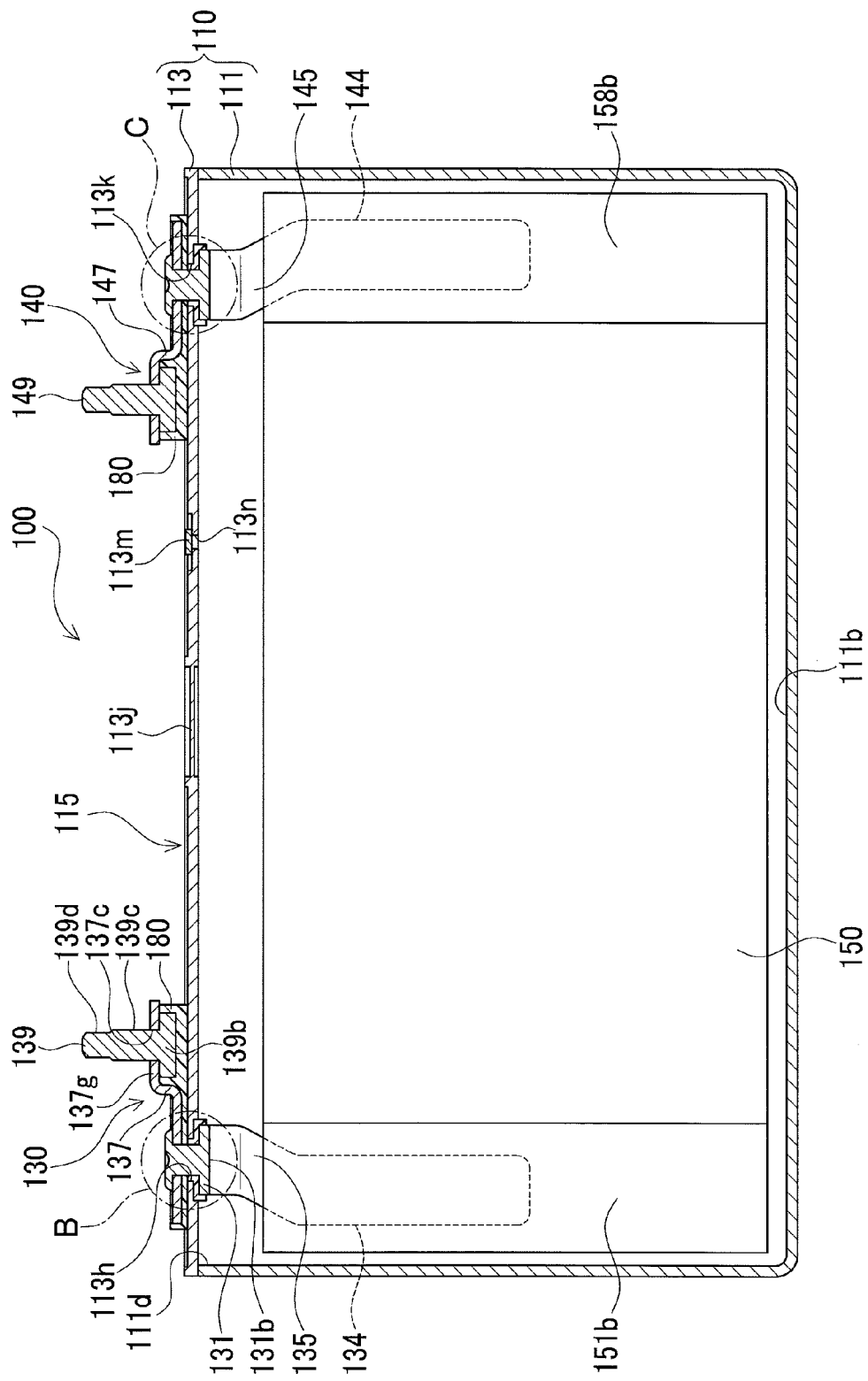
FIG. 1 is a cross sectional view of a battery in an embodiment.
Figure 2:
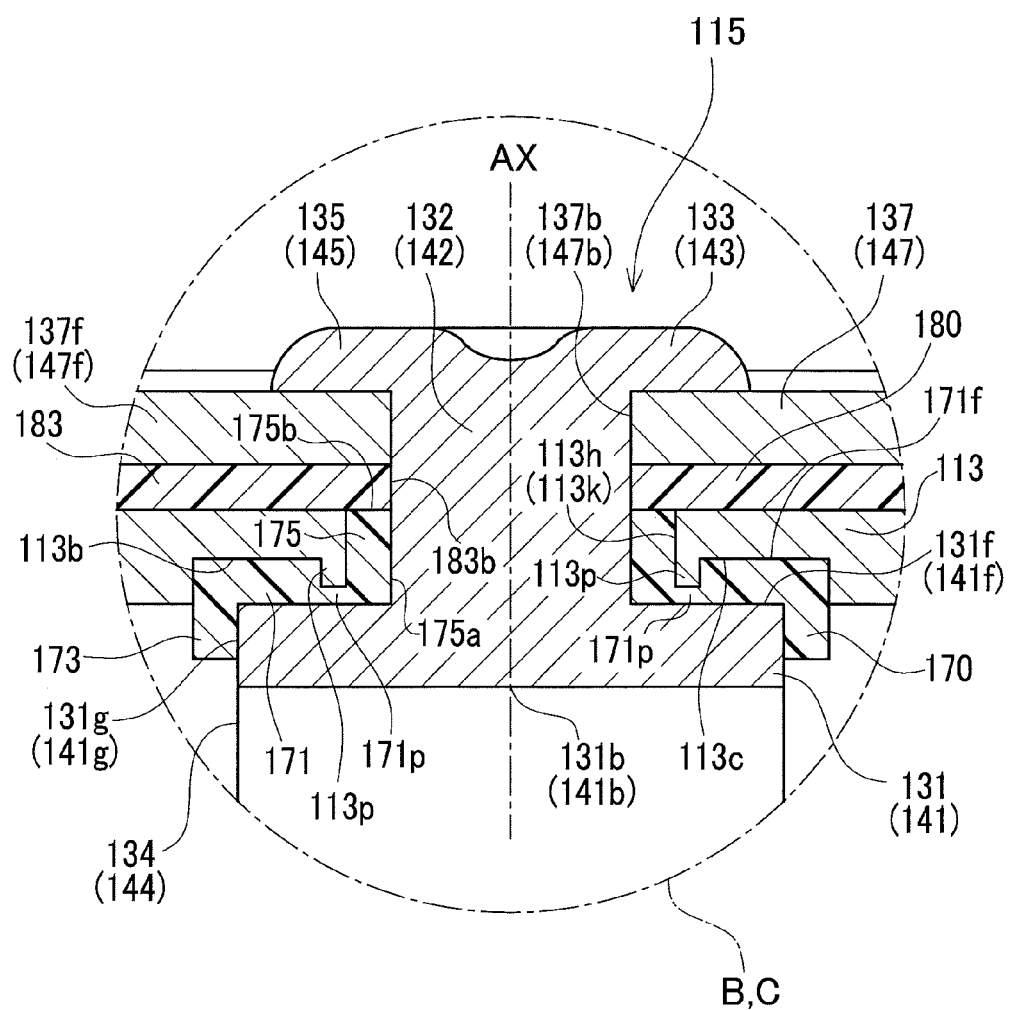
FIG. 2 is an enlarged view of a section B and a section C in FIG. 1.
Figure 3:
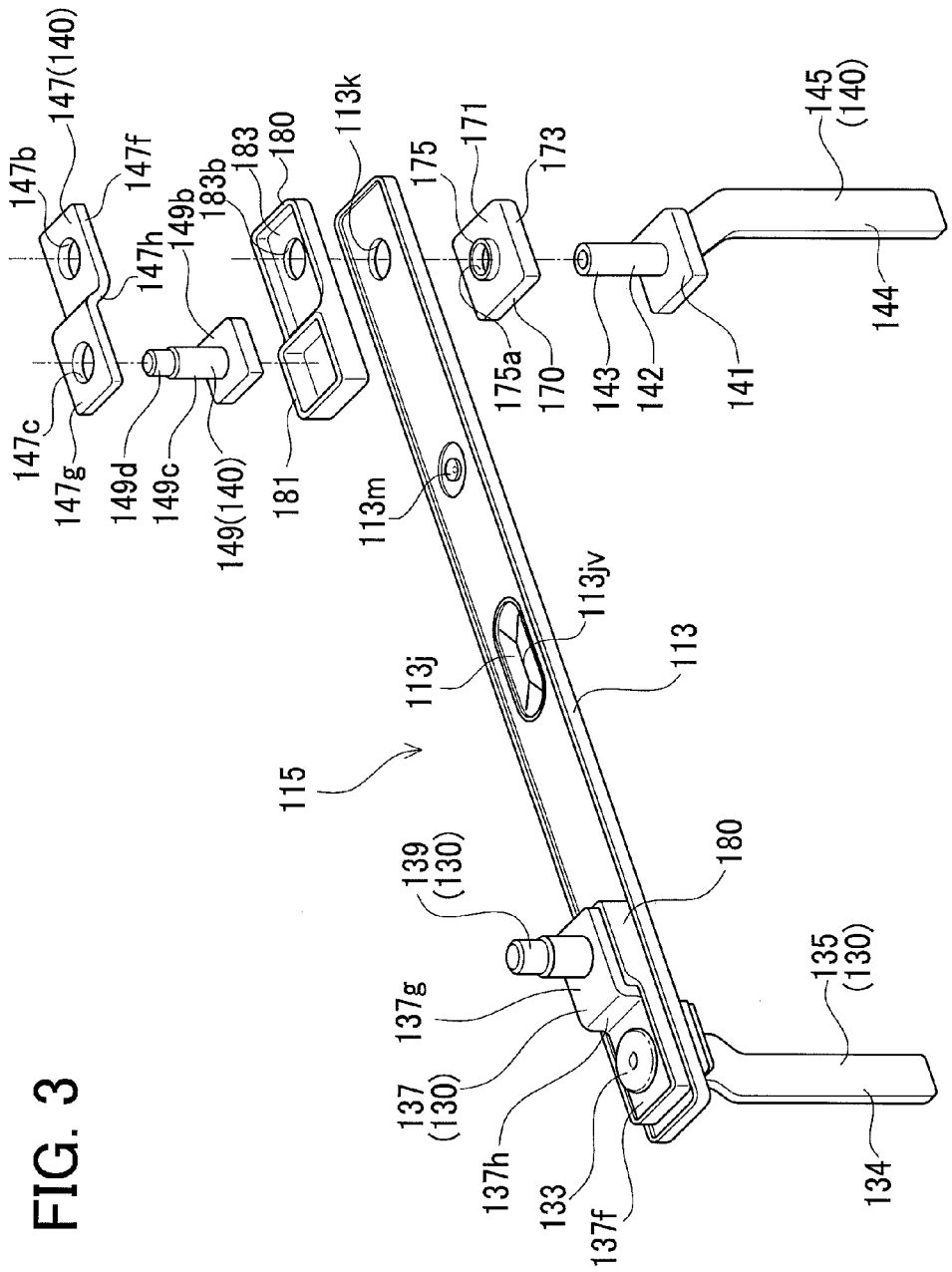
FIG. 3 is a view showing a terminal-attached lid member in the embodiment.

A detailed description of a preferred embodiment of the present invention will now be given referring to the accompanying drawings. FIG. 1 is a cross sectional view of a battery 100 in the present embodiment. FIG. 2 is an enlarged view of a section B and a section C in FIG. 1. It is to be noted that different parts in the section C from those in the section B are assigned parenthesized reference signs in FIG. 2. FIG. 3 is an exploded perspective view showing part of a terminal-attached lid member 115 in the present embodiment. In the present description, the left, right, upper, and lower sides are defined with reference to FIG. 1 and a near side on a drawing paper of FIG. 1 is defined as a front side and a far side on the drawing paper is defined as a rear side.

The battery 100 of the present embodiment is, as shown in FIG. 1, a lithium ion secondary battery that includes a case body (one example of a case body member) 111 of a rectangular box shape having an opening 111d, and an electrode body (one example of a power generating element) 150 enclosed in the case body 111. The battery 100 further includes a plate-shaped case lid (one example of a case lid member) 113 that closes the opening 111d of the case body 111. The case body 111 and the case lid 113 are integrally welded to each other, forming a battery case 110. The battery case 110 is made of metal (concretely, pure aluminum). This battery 100 is a rectangular battery to be mounted in vehicles such as a hybrid vehicle and an electric vehicle or in battery using devices such as a hammer drill.

The case lid 113 has a rectangular plate-like shape and is formed with circular through holes 113h, 113k each penetrating through the case lid 113 in positions near both ends in a longitudinal direction (a lateral direction in FIG. 1). The case lid 113 is further provided, at its center in the longitudinal direction, with a safety valve 113j. This safety valve 113j is formed integral with the case lid 113 to constitute a part of the case lid 113.

The safety valve 113j is formed to be thinner than other portions of the case lid 113 and is formed, on its upper surface, with a groove 113jv (see FIG. 3). Accordingly, the safety valve 113j operates when the internal pressure of the battery case 110 reaches a predetermined pressure. Specifically, the groove 113jv ruptures when the internal pressure reaches the predetermined pressure, thereby allowing gas in the battery case 110 to release out.

The case lid 113 is formed, between the safety valve 113j and the through hole 113k, with a liquid inlet 113n (see FIG. 1) through which electrolyte (not shown) is poured into the battery case 110. In the completed battery 100, this liquid inlet 113n is sealed with a plug 113m.

The battery 100 further includes electrode terminal members (a positive terminal member 130 and a negative terminal member 140) each of which is connected to the electrode body 150 inside the case body 111 and extends out through respective through holes 113h and 113k of the case lid 113.

The positive terminal member 130 consists of a positive connecting member (an element connecting terminal) 135, a positive outer terminal member (an outer connecting terminal) 137, and a positive fastening member (a bolt) 139 (see FIGS. 1 and 3). The connecting member 135 is made of metal (pure aluminum), and is connected to the electrode body 150 and extends out through the through hole 113h of the case lid 113. The outer terminal member 137 is made of metal, and is located on the case lid 113, that is, outside the battery case 110, and is electrically connected to the connecting member 135 outside the battery case 110. The fastening member 139 is made of metal, and is located on the case lid 113, that is, outside the battery case 110, and is electrically connected to the outer terminal member 137.

To be specific, the positive connecting member 135 includes a seat part (one example of a flat plate part) 131, an insert-through part 132, an electrode body connecting part 134, and a deformed part 133 (see FIGS. 1 to 3). The seat part 131 has a rectangular plate-like shape and is located in the case body 111. The insert-through part 132 has a columnar shape protruding from an upper surface (one example of a main surface) 131f of the seat part 131 and is inserted through the through hole 113h of the case lid 113. The deformed part 133 is a portion continuous with an upper end of the insert-through part 132 and is formed by caulking or riveting, that is, deformed to extend in diameter into a circular disk shape, and thus electrically connected to the positive outer terminal member 137. The electrode body connecting part 134 is shaped to extend from a lower surface 131b of the seat part 131 toward a bottom 111b of the case body 111 and is bonded to a positive mixture layer uncoated portion 151b of the electrode body 150. Thus, the positive connecting member 135 and the electrode body 150 are electrically and mechanically connected to each other.

The positive outer terminal member 137 is formed of a metal plate having a nearly Z shape in side view. This terminal member 137 includes a fixed part 137f fixed by the deformed part 133, a connection part 137g connected to the fastening member 139, and a joint part 137h joining the fixed part 137f and the connection part 137g. The fixed part 137f is formed with a through hole 137b penetrating therethrough. In this through hole 137b, the insert-through part 132 of the positive connecting member 135 is inserted. The connection part 137g is also formed with a through hole 137c penetrating therethrough.

The positive fastening member 139 is a metal bolt including a rectangular plate-shaped head portion 139b and a columnar shaft portion 139c. The shaft portion 139c includes a distal end portion formed with screw threads 139d. The shaft portion 139c of the fastening member 139 is inserted in the through hole 137c of the positive outer terminal member 137.

The negative terminal member 140 consists of a negative connecting member (an element connecting terminal) 145, a negative outer terminal member (an outer connecting terminal) 147, and a negative fastening member (a bolt) 149 (see FIGS. 1 and 3). The connecting member 145 is made of metal (pure copper) and is connected to the electrode body 150 and also extends out through the through hole 113k of the case lid 113. The outer terminal member 147 is made of metal and is located on the case lid 113, that is, outside the battery case 110, and is electrically connected to the connecting member 145 outside the battery case 110. The fastening member 149 is made of metal and is located on the case lid 113, that is, outside the battery case 110, and is electrically connected to the outer terminal member 147.

To be concrete, the negative connecting member 145 includes a seat part (one example of a flat plate part) 141, an insert-through part 142, an electrode body connecting part 144, and a deformed part 143 (see FIGS. 1 to 3). The seat part 141 has a rectangular plate-like shape and is located in the case body 111. The insert-through part 142 has a columnar shape protruding from an upper surface (one example of a main surface) 141f of the seat part 141 and is inserted through the through hole 113k of the case lid 113. The deformed part 143 is a portion continuous with an upper end of the insert-through part 142 and is riveted, that is, deformed to extend in diameter into a circular disk shape, and thus electrically connected to the negative outer terminal member 147. The electrode body connecting part 144 is shaped to extend from a lower surface 141b of the seat part 141 toward the bottom 111b of the case body 111 and is bonded to a negative mixture layer uncoated portion 158b of the electrode body 150. Thus, the negative connecting member 145 and the electrode body 150 are electrically and mechanically connected to each other.

The negative outer terminal member 147 is formed of a metal plate having a nearly Z shape in side view. This terminal member 147 includes a fixed part 147f fixed by the deformed part 143, a connection part 147g connected to the fastening member 149, and a joint part 147h joining the fixed part 147f and the connection part 147g. The fixed part 147f is formed with a through hole 147b penetrating therethrough. In this through hole 147b, the insert-through part 142 of the negative connecting member 145 is inserted. The connection part 147g is also formed with a through hole 147c penetrating therethrough.

The negative fastening member 149 is a metal bolt including a rectangular plate-shaped head portion 149b and a columnar shaft portion 149c. The shaft portion 149c includes a distal end portion formed with screw threads 149d. The shaft portion 149c of the fastening member 149 is inserted in the through hole 147c of the negative outer terminal member 147.

The battery 100 further includes a first insulating member (one example of a battery sealing member) 170 interposed between the positive terminal member 130 (i.e., the positive connecting member 135) and the case lid 113 to electrically insulate them from each other. Another first insulating member 170 is also interposed between the negative terminal member 140 (i.e., the negative connecting member 145) and the case lid 113.

Specifically, the first insulating member 170 is a gasket made of electrically insulating resin (concretely, PFA). This first insulting member 170 (hereinafter, also referred to as a "gasket 170") includes an insulating interposed part (one example of a sealing part) 171, an insulating side wall (one example of an outer edge portion) 173, and an insertion part (one example of an inner edge portion) 175 (see FIGS. 2 and 3). The insulating interposed part 171 has a flat plate-like shape and is interposed between the upper surface 131f (the upper surface 141f) of the seat part 131 (the seat part 141) of the positive terminal member 130 (the negative terminal member 140) and the lower surface (the inner surface) 113b of the case lid 113.

The insulating side wall 173 is a rectangular annular side wall located on an outer peripheral edge of the insulating interposed part 171. This side wall 173 surrounds the outer peripheral surface 131g (the outer peripheral surface 141g) of the seat part 131 (the seat part 141). With the above configuration, the upper surface 131f (the upper surface 141f) of the seat part 131 (the seat part 141) is retained in the lower surface of the first insulating member 170, thereby restraining rotation of the insulating member 170 with respect to the seat part 131 (the seat part 141). The side wall 173 is also referred to as an outer burring portion.

The insertion part 175 has a cylindrical shape that is positioned on the inner peripheral edge (at the center in plan view) of the insulating interposed part 171 and that protrudes from an upper surface 171f of the insulating interposed part 171 and is inserted through the through hole 113h (through hole 113k) of the case lid 113. A cylindrical portion of this insertion part 175 is formed with an insert-through hole 175a in which the insert-through part 132 of the positive terminal member 130 (the insert-through part 142 of the negative terminal member 140) is inserted. The insertion part 175 is also referred to as an inner burring portion. The first insulating member 170 will be further explained in detail later.

The battery 100 further includes a second insulating member 180 made of electrically insulating resin (concretely, 100% PPS) and placed on the case lid 113. This second insulating member 180 is interposed between the positive terminal member 130 (concretely, the positive outer terminal member 137 and the positive fastening member 139) and the case lid 113 to electrically insulate them from each other. Another second insulating member 180 is also interposed between the negative terminal member 140 (concretely, the negative outer terminal member 147 and the negative fastening member 149) and the case lid 113. The second insulating member 180 is also referred to as an insulator.

Specifically, each second insulating member 180 includes a head placing part 181 in which a head 139b of the positive fastening member 139 (a head 149b of the negative fastening member 149) is placed, and a fastening placing part 183 in which the fixed part 137f of the positive outer terminal member 137 (the fixed part 147f of the negative outer terminal member 147) is placed. The fastening placing part 183 is formed with a through hole 183b penetrating therethrough. In this through hole 183b, the insert-through part 132 of the positive terminal member 130 (the insert-through part 142 of the negative terminal member 140) is inserted.

In the present embodiment, the terminal-attached lid member 115 consists of the case lid 113, the electrode terminal members (the positive terminal member 130 and the negative terminal member 140), the first insulating members 170, 170, and the second insulating members 180, 180. To be concrete, the positive outer terminal member 137, the second insulating member 180, the case lid 113, and the first insulating member 170 are fixedly clamped between the deformed part 133 and the seat part 131 of the positive terminal member 130, while the negative outer terminal member 147, the second insulating member 180, the case lid 113, and the first insulating member 170 are fixedly clamped between the deformed part 143 and the seat part 141 of the negative terminal member 140. This assembly integrally constitutes the terminal-attached lid member 115.

In the terminal-attached lid member 115, the insulating interposed part 171 of the first insulating member 170 is held between the upper surface 131f (the upper surface 141f) of the seat part 131 (the seat part 141) of the positive terminal member 130 (the negative terminal member 140) and the lower surface (the inner surface) 113b of the case lid 113 so that the insulating interposed part 171 is placed in an elastically compressed state in its own thickness direction (the axial direction AX in FIG. 2). Furthermore, the insertion part 175 of the first insulating member 170 is elastically compressed in its own axial direction (the axial direction AX in FIG. 2) so that a distal end 175b of the insertion part 175 is in close contact with the second insulating member 180. In the above manner, the first insulating members 170 seal the through holes 113h, 113k of the case lid 113.

Herein, as shown in FIG. 2, a protrusion 113p cylindrically protruding downward from the lower surface (the inner surface) 113b of the case lid 113 is formed on the peripheral edge (herein, referred to as a "through-hole peripheral edge portion 113c") of each through hole 113h, 113k of the case lid 113. This protrusion 113p bites or digs into a portion of the upper surface 171f of the insulating interposed part 171, close to the insertion part 175, when the positive terminal member 130 (the negative terminal member 140) is fixed by riveting. Accordingly, the first insulating member 170 is formed with a highly compressed portion 171p pressed between the protrusion 113p and the upper surface 131f (the upper surface 141l) of the seat part 131 (the seat part 141) of the positive terminal member 130 (the negative terminal member 140). This highly compressed portion 171p is a portion providing highest sealing performance or strength in the first insulating member 170.

Figure 4:
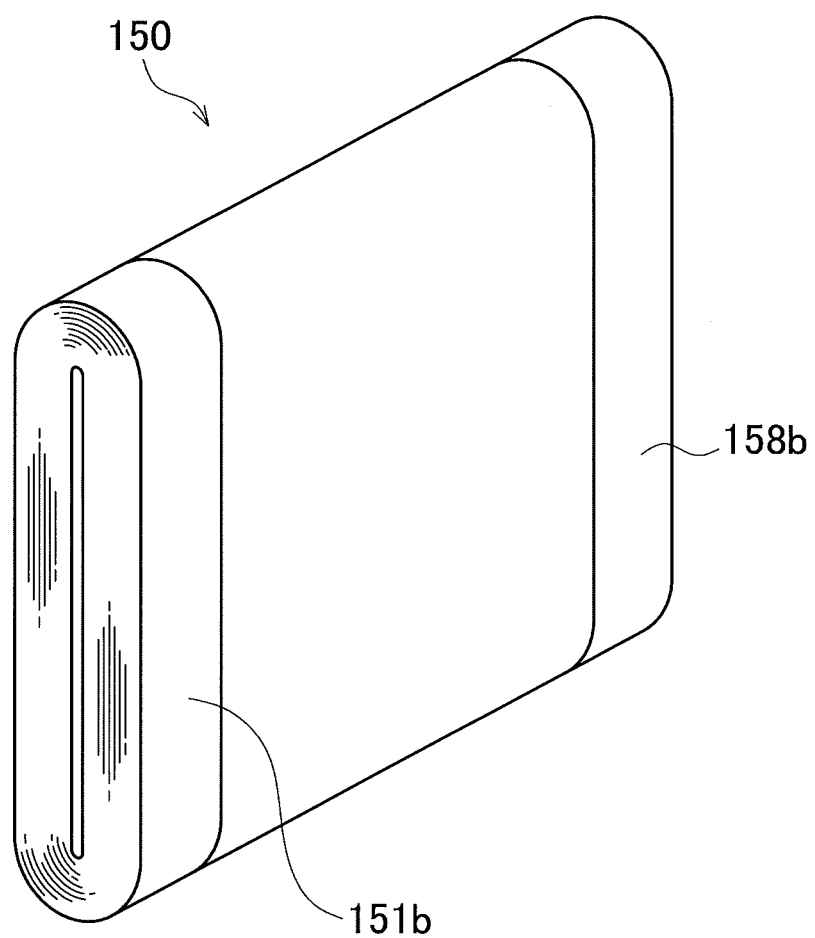
FIG. 4 is a perspective view of an electrode body in the embodiment.
Figure 5:
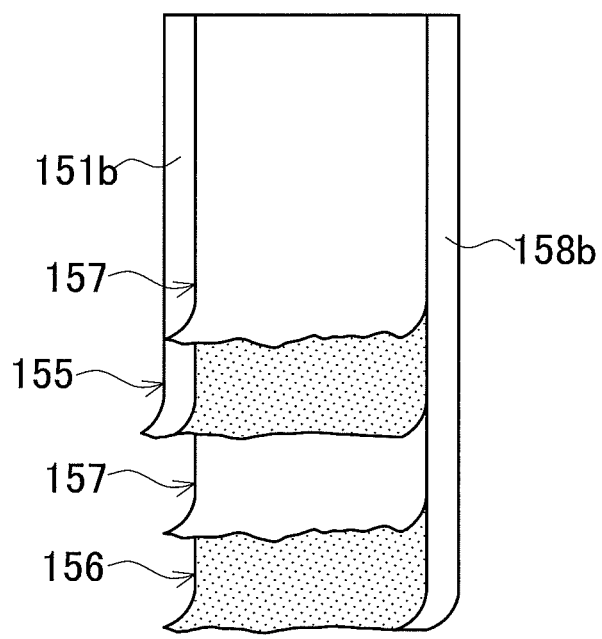
FIG. 5 is a view showing a configuration of the electrode body.

Next, the electrode body 150 will be explained referring to FIGS. 4 to 7. As shown in FIGS. 4 and 5, the electrode body 150 is a wound electrode body having a flattened shape in which a strip-shaped positive electrode sheet 155, a strip-shaped negative electrode sheet 156, and separators 157 are wound together into a flattened shape.

Figure 6:
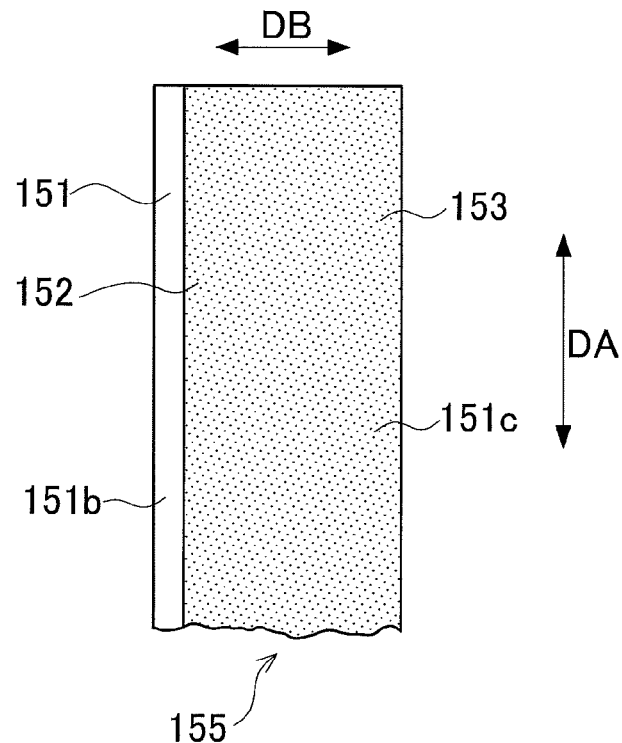
FIG. 6 is a view showing a positive electrode sheet of the electrode body.

The positive electrode sheet 155 includes a strip-shaped positive substrate 151 being made of an aluminum foil and extending in a longitudinal direction DA, and positive electrode mixture layers 152 each placed on part of each surface of the substrate 151 as shown in FIG. 6. The positive electrode mixture layer 152 contains positive active material 153, electrically conductive material made of acetylene black, and PVDF (binder).

Of the positive substrate 151, a portion coated with the positive electrode mixture layers 152 is referred to as a positive mixture layer coated portion 151c, while a portion not coated with the positive electrode mixture layers 152 is referred to as a positive mixture layer uncoated portion 151b. This uncoated portion 151b is located at one end (a left end in FIG. 6) of the substrate 151 (the positive electrode sheet 155) in a width direction DB (a lateral direction in FIG. 6) and extends along one long side of the substrate 151 (the positive electrode sheet 155) in a strip shape extending in the longitudinal direction DA of the substrate 151 (the positive electrode sheet 155).

Figure 7:
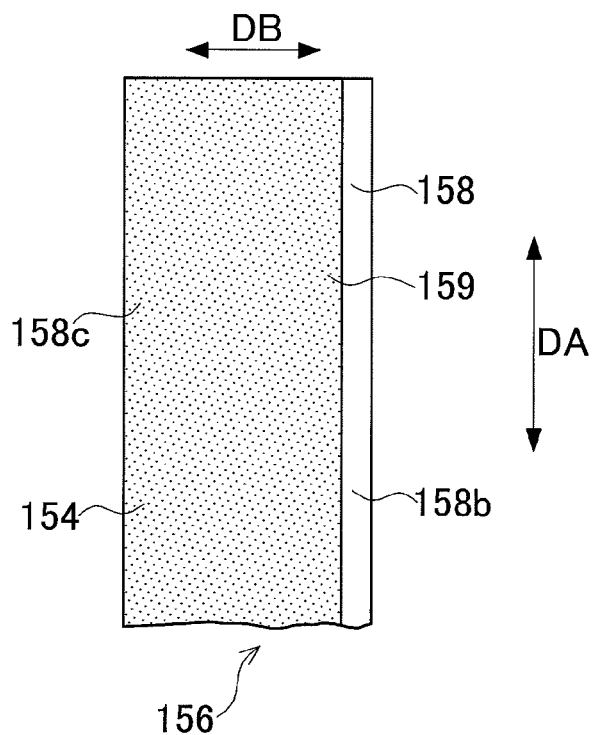
FIG. 7 is a view showing a negative electrode sheet of the electrode body.
Figure 8:
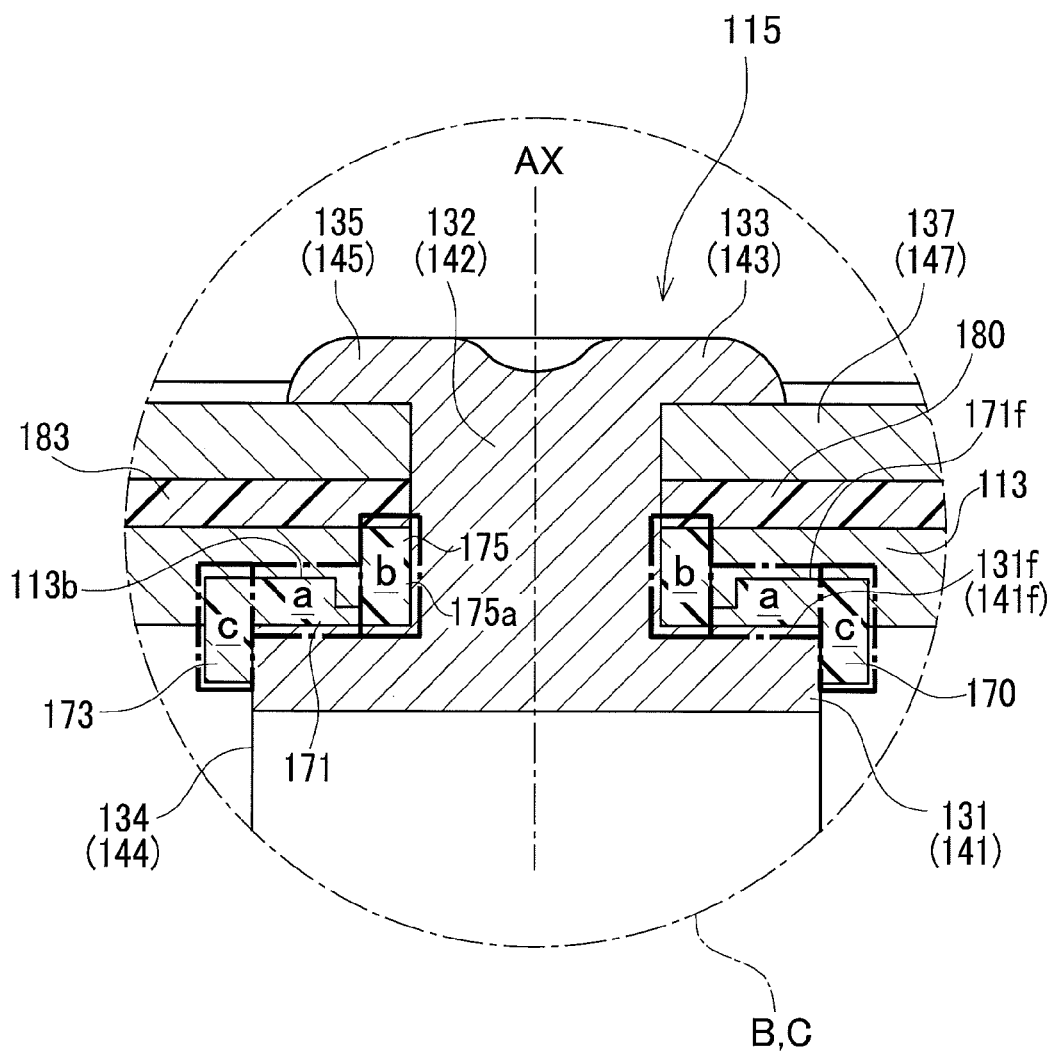
FIG. 8 is an enlarged view of the section B and the section C to explain a configuration of a gasket (a first insulating member) in the embodiment.

The negative electrode sheet 156 includes a strip-shaped negative substrate 158 being formed of a copper foil and extending in the longitudinal direction DA, and negative electrode mixture layers 159 each placed on part of each surface of the substrate 158 as shown in FIG. 7. The negative electrode mixture layer 159 contains negative active material 154, SBR (binder), and CMC (thickener).

Of the negative substrate 158, a portion coated with the negative electrode mixture layers 159 is referred to as a negative mixture layer coated portion 158c, while a portion uncoated with the negative electrode mixture layers 159 is referred to as a negative mixture layer uncoated portion 158b. This uncoated portion 158b is located at one end (a right end in FIG. 7) of the substrate 158 (the negative electrode sheet 156) in the width direction DB (a lateral direction in FIG. 7) and extends along one long side of the substrate 158 (negative electrode sheet 156) in a strip shape extending in the longitudinal direction DA of the substrate 158 (negative electrode sheet 156).

The details of the first insulating member 170 are explained below referring to FIGS. 8 to 11. The following explanation is given to the first insulating member 170 provided in the positive terminal member 130. The first insulating member 170 provided in the negative terminal member 140 is identical to the first insulating member 170 provided in the positive terminal member 130 and thus is not repeatedly explained. As described above, the first insulating member 170 is formed with the insert-through hole 175a in which the insert-through part 132 of the positive terminal member 130 is inserted. The first insulating member 170 includes the insertion part 175 located on an inner side close to the insert-through hole 175a, the insulating side wall 173 located on an outer side apart from the insert-through hole 175a, and the insulating interposed part 171 located between the insertion part 175 and the side wall 173 (see FIGS. 2 and 8).

Figure 9:
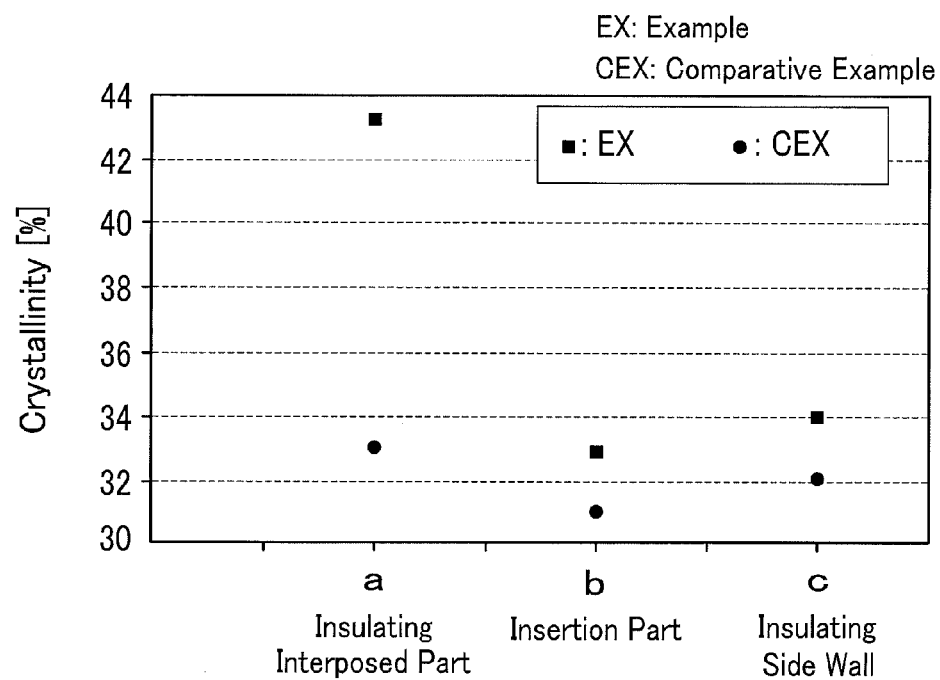
FIG. 9 is a graph showing measured crystallinity of a gasket in Example and a gasket in Comparative example.

FIG. 9 is a graph showing crystallinity (crystallization degree) of the first insulating member 170 (the gasket 170). In FIG. 9, the alphabets a, b, and c, in a lateral axis correspond to sections a, b, and c assigned to the gasket 170 in FIG. 8. In other words, a in FIG. 9 represents a crystallinity of the insulating interposed part 171 of the gasket 170, b in FIG. 9 represents a crystallinity of the insertion part 175 of the gasket 170, and c in FIG. 9 represents a crystallinity of the insulating side wall 173 of the gasket 170.

Herein, the crystallinity denotes a ratio of a crystalline area to total area. Since an area having a low crystallinity has a large free volume, molecules of an electrolyte poured in the battery case 110 may penetrate into the gasket 170. In case the molecules penetrate, they disperse in the gasket at high speeds. On the other hand, since an area having a high crystallinity has a small free volume, molecules of an electrolyte poured in the battery case 110 is less likely to penetrate into the gasket 170. Even in case the molecules penetrate, they disperse in the gasket at low speeds.

In the battery 100 of the present embodiment, the crystallinity of the insulating interposed part 171 is a higher value than the crystallinities of the insertion part 175 and the insulating side wall 173. Concretely, the crystallinity of the insulating interposed part 171 is about 43%, the crystallinity of the insertion part 175 is about 33%, and the crystallinity of the side wall 173 is about 34%. Specifically, the gasket 170 of the present embodiment is configured such that the crystallinity of the insulating interposed part 171 is higher by about 10% than the crystallinity of other region (the insertion part 175 and the side wall 173). Since the insulating interposed part 171 is held between the lower surface (the inner surface) 113b of the case lid 113 and the upper surface 131f of the seat part 131 of the positive terminal member 130, the insulating interposed part 171 is a region, of the gasket 170, most subjected to the surface pressure. The gasket 170 provides a best sealing performance in the region most subjected to the surface pressure. In this regard, the insulating interposed part 171 is also referred to as a sealing part 171. The gasket 170 of the present embodiment is configured such that the crystallinity of the sealing part 171 most subjected to the surface pressure is set to be higher than the crystallinity of the other region.

The crystallinities in Example shown in FIG. 9 were measured on about 10 mg of each sample of the gasket 170 by use of a DSC analyzer. The DSC analyzer used herein is a differential scanning calorimeter, Thermo plus EVO DSC 8120 manufactured by Rigaku Co. The measurement atmosphere was atmospheric air. The measurement temperature was increased from a normal temperature to 350° C. at a speed of 10° C./min. The crystallinity is calculated by the following formula (I):

$$\text{Crystallinity (\%)} = (X/Y) \times 100 \tag{1}$$

X: Fusion enthalpy (Measured fusion heat quantity),

Y: Perfect fusion enthalpy (Perfect crystal fusion heat quantity)

where the fusion enthalpy (measured fusion heat quantity) X is a heat quantity measured by use of the DSC analyzer, and the perfect fusion enthalpy (perfect crystal fusion heat quantity) Y is a fusion heat quantity of an ideal, perfect crystal containing no lattice defect and no impurity. The perfect fusion enthalpy (perfect crystal fusion heat quantity) Y is a value uniquely determined according to the material of the gasket 170.

Figure 10:
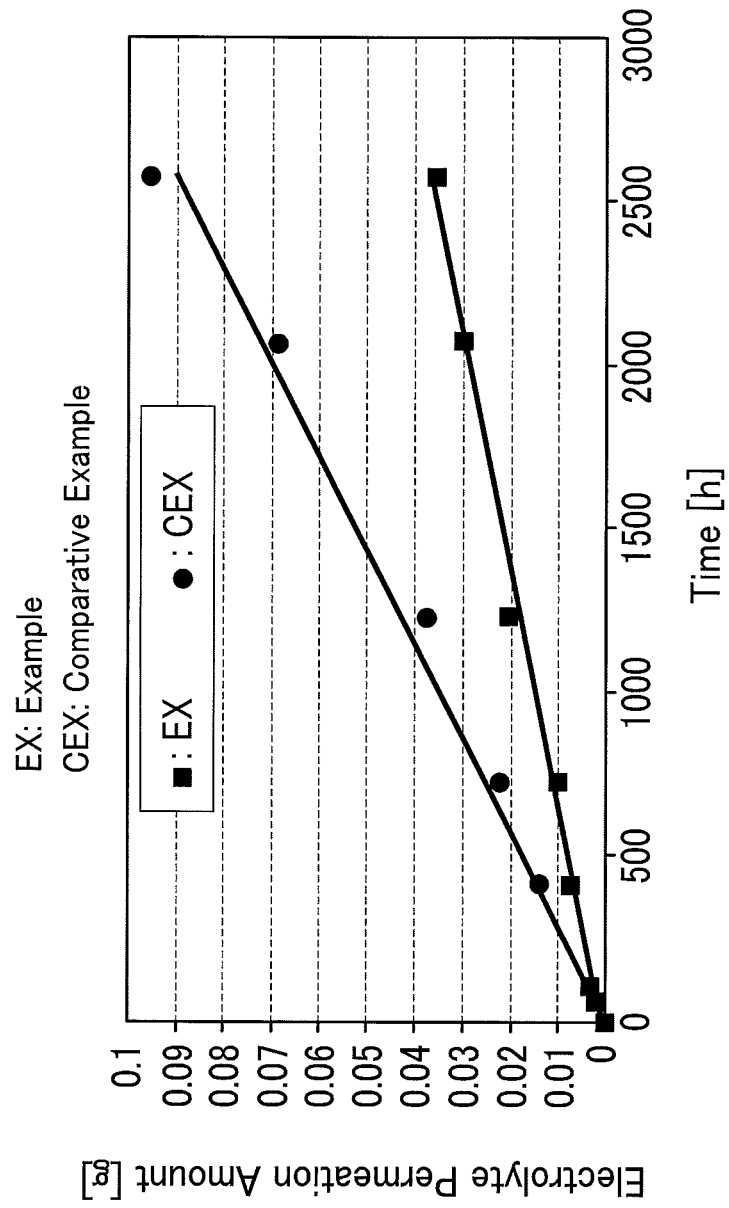
FIG. 10 is a graph showing measured electrolyte permeation amount of the gasket in Example and the gasket in Comparative example.

Results of experiments performed to verity the advantageous effects of the gasket 170 of the present embodiment will be explained below referring to FIG. 10. Example in FIG. 10 shows the case of using the gasket 170 (the gasket 170 of the embodiment) shown as Example in FIG. 9. Comparative example in FIG. 10 shows the case of using a gasket different from the gasket 170 of the embodiment.

The gasket used in Comparative example is a gasket having a crystallinity shown as Comparative example in FIG. 9. To be concrete, the gasket of Comparative example is configured such that the crystallinity of an insulating interposed part is about 33%, the crystallinity of an insertion part is about 31%, and the crystallinity of an insulating side wall is about 32%. In other words, in the gasket of Comparative example, the crystallinities of the insulating interposed part, insertion part, and insulating side wall are almost equivalent values. The gasket of Comparative example was produced by injection molding. The method for measuring the crystallinity of the gasket of Comparative example shown in FIG. 9 is the same as that used for Example mentioned above.

FIG. 10 is a graph showing electrolyte permeation amount in a case where a battery is left at a temperature of 80° C. A lateral axis in FIG. 10 represents time (unit: h) and a vertical axis represents electrolyte permeation amount (unit: g). As indicated by an approximate line in FIG. 10, a permeation speed of the electrolyte in the battery using the gasket of Comparative example is two or three times faster than that in the battery 100 using the gasket 170 of Example. The experiment shown in FIG. 10 thus reveals that the gasket 170 with the insulating interposed part 171 having a higher crystallinity than the insertion part 175 and the insulating side wall 173 in Example provides a good sealing performance between the case lid 113 and the electrode terminal members (the positive terminal member 130 and the negative terminal member 140) as compared with the gasket configured such that all portions have almost uniform crystallinities in Comparative example, and also that the good sealing performance is maintained.

A method for manufacturing the gasket 170 of the present embodiment will be explained below referring to FIG. 11. One example of this manufacturing method of the gasket 170 of the embodiment is a manufacturing method disclosed in Japanese patent No. 3916728 to YODOGAWA Corporation. Specifically, the gasket 170 having the above characteristics is manufactured as below. Firstly, a PFA sheet having a 0.5 mm thickness (a slightly-milky white colored transparent sheet) made by extrusion molding PFA with a melt flow index of 2 g/10 min at 320° C. is punched out to produce a flat rectangular raw piece 20.

Further, a molding die 30 consisting of three blocks is prepared. In FIG. 11 (b), 30a denotes a first female die, 30b denotes a second female die, and 30c denotes a male die. An upper hole of the first female die 30a has an exact size to receive the raw piece 20. A protrusion of the second female die 30b has an exact diameter allowing a through hole 21 of the raw piece 20 to fit on.

In the assembled first female die 30a and second female die 30b, the aforementioned raw piece 20 is set (see FIG. 11(a)), and then the male die 30c is engaged with those female dies 30a and 30b (see FIG. 11(b)).

The die 30 is heated up to 290° C. and held at this temperature for 2 minutes, gelatinizing the raw piece 20, and then the female die 30c is pushed toward the female dies 30a and 30b to pressurize the raw piece 20 under 100 kg/cm². Accordingly, the raw piece 20 is deformed into a softened three-dimensional (3D) piece 23 having a three-dimensional shape conforming to a die cavity (see FIG. 11(c)).

Successively, the die 30 is immersed in plenty of water (room temperature) in a tank while the die 30 is held in a pressurizing state, thereby cooling the softened 3D-piece 23 to form a desired product 25.

Figure 11:
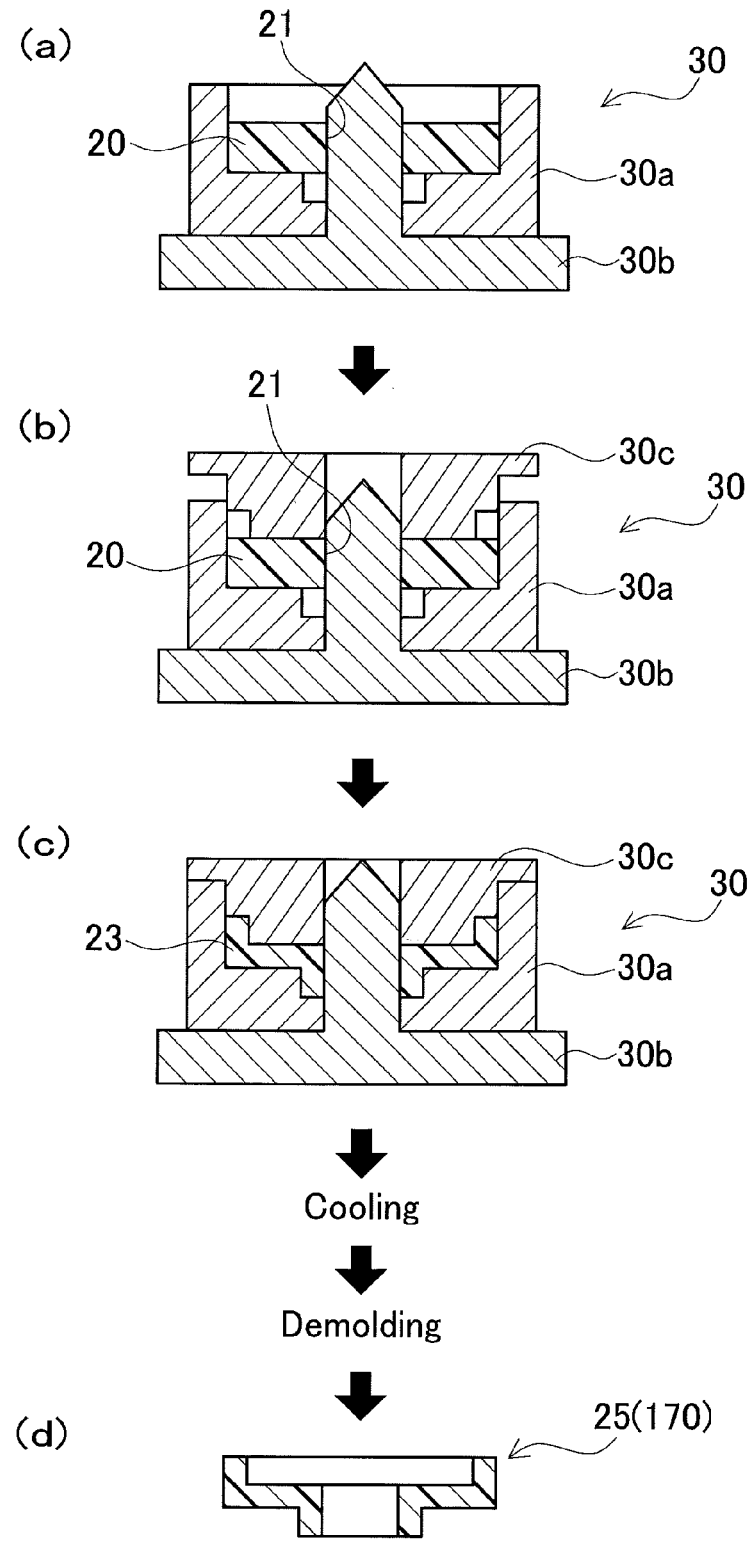
FIG. 11 is a view showing a method for manufacturing the gasket in the embodiment.

Finally, the desired product 25 after cooling is taken out of the die 30 (see FIG. 11 (d)). Thus, the gasket 170 formed of the desired product 25 is obtained.

The manufacturing process of the gasket 170 is summed up below. The gasket 170 of the embodiment is manufactured through the following steps A, B, and C. The step A is a step of feeding the raw piece 20 made of fluorinated resin in substantially equal volume to the cavity volume of the die after pressing. In the step A, the reason for using the raw piece of substantially the same volume as the cavity volume of the clamped die is because a raw piece of a smaller volume than the cavity volume beyond an allowable range may result in low dimensional stability and densification, while a raw piece of a larger volume than the cavity volume beyond an allowable range may result in generation of burrs.

The step B is a step of heating the raw piece 20 up to its softening temperature or more in the die to soften the raw piece 20 and also applying pressure to the raw piece 20 in the die to deform the piece 20 into the softened 3D-piece 23 having a shape conforming to the die cavity. It is to be noted that heating can be selected from electric heating, heating by heat medium (oil, steam, gas), high-frequency heating, infrared heating, and others. A heating temperature and a heating time are set to a temperature and a time enough to heat the raw piece 20 to a softening temperature or more. The temperature of the raw piece 20 for PFA (a fusion point: 302 to 310° C.) is preferably set to 260 to 300° C. which is lower by 50° C. to 0° C. than the fusion point. The heating time is preferably set to for example 1 to 10 min., particularly, 1.5 to 5 min from when a predetermined temperature is reached.

The step C is a step of cooling the softened 3D-piece 23 down to the softening temperature or less in the mold while keeping the pressurizing state, thereby forming the desired product 25, and then demolding the product 25 from the die. The pressurizing method can be selected from mechanisms utilizing hydraulic pressure, pneumatic pressure, and water pressure and further a mechanism utilizing heat expansion by heating. The pressure is appropriate for example in the order of 50 to 300 kg/cm².

The raw piece 20 made of fluorinated resin is an extruded product made of tetrafluoroethylene perfluoroalkyl vinyl ether copolymer (PFA) at a grade that melt flow index (measured at a higher temperature by 10° C. than the fusion point) is less than about 5 g/10 min. The extruded product made of fluorinated resin at a grade that melt flow index (measured at a higher temperature by 10° C. than the fusion point) is less than about 5 g/10 min is advantageous in resistance to heat cycle shock and resistance to stress crack.

The gasket 170 of the embodiment is produced by using tetrafluoroethylene perfluoroalkyl vinyl ether copolymer (PFA) in view of its superiority in resistance to heat stress crack and resistance to heat aging. Alternatively, the gasket 170 may be made of any other fluorinated resin. For example, this is selectable from tetrafluoroethylene hexafluoropropylene copolymer (FEP), ethylene tetrafluoroethylene copolymer (ETFE), ethylene chlorotrifluoroethyle copolymer (ECTFE), vinylidene fluoride fluorinated rubber, propylene tetrafluoroethylene fluorinated rubber, tetorafluoroethylene perfluoroalkyl vinyl ether fluorinated rubber, thermoplastic fluorinated rubber, polytetrafluoroethylene (PTFE), and others. In the case of using FEP (fusion point: 255 to 265° C.), the heating temperature in the aforementioned manufacturing step B is preferably set to on the order of 200 to 260° C. which is lower by on the order of 50 to 0° C. than the fusion point. Further, in the case of using PTFE (fusion point: 327° C.), the heating temperature in the above manufacturing step B is preferably set to a temperature in a range from the softening temperature or more to a higher temperature by about 20 to 25° C. than the fusion point, for example, to 280 to 350° C.

As the details are explained above, the battery 100 of the embodiment includes the electrode body 150 (the power generating element), the case body 111 (the case body member) having the opening 111d and internally enclosing the electrode body 150 and the electrolyte, the case lid 113 (the case lid member) closing the opening 111d of the case body 111, the electrode terminal members (the positive terminal member 130 and the negative terminal member 140) having the insert-through part 132 (142) inserted in the through hole 113h (113k) provided in the case lid 113 and being electrically connected to the electrode body 150, and the gaskets 170 (the battery sealing members) each being made of synthetic resin and having the insulating interposed part (the sealing part) clamped between the electrode terminal member (the positive terminal member 130, the negative terminal member 140) and the inner surface 113b of the case lid member 113. The gaskets 170 are each configured such that the crystallinity of the insulating interposed part 171 is higher than the crystallinity of remaining portions (the insertion part 175 and the insulating side wall 173) other than the insulating interposed part 171. The insulating interposed part (the sealing part) 171 is a portion clamped between the electrode terminal member (the positive terminal member 130, the negative terminal member 140) and the inner surface 113b of the case lid member 113 and thus subjected to a compression force by clamping.

According to the battery 100 of the embodiment, the insulating interposed part 171 having a high crystallinity, the insulating interposed part 171 has a high density. Therefore, the molecules forming the electrolyte are less likely to permeate through the insulating interposed part 171. This can prevent the electrolyte (in particular vaporized electrolyte) from leaking through the inside of the gasket 170 to the outside of the battery 100. It is further possible to prevent water and others from entering from the outside of the case lid 113 into the battery case 110. In the battery 100 of the embodiment with the insulating interposed part 171 configured to be 40% or more in crystallinity, particularly, it is possible to appropriately prevent leakage of the electrolyte out of the battery 100 and entrance of water into the battery 100.

In the battery 100 of the embodiment, each gasket 170 is formed with the insert-through hole 175a in which the insert-through part 132 (142) is inserted. Each gasket 170 includes the insertion part 175 (the inner edge portion) located on an inner peripheral side close to the insert-through hole 175a relative to the insulating interposed part 171 to surround this hole 175a, the insulating interposed part 171 surrounding the insertion part 175, and the insulating side wall 173 (the outer edge portion) located on an outer side opposite to the insertion part 175 relative to the insulating interposed part 171 to surround the insulating interposed part 171. The insulating interposed part 171 has a higher crystallinity than the insertion part 175 and the insulating side wall 173.

Accordingly, even when the usage environment temperature of the battery 100 rises, it is possible to prevent deterioration in crystallinity of the insulating interposed part 171 and thus maintain a good sealing performance of the gasket 170. This results from the following factors. In the battery 100 of the embodiment, the insulating interposed part 171 with a high crystallinity is interposed between the insertion part 175 and the insulating side wall 173 each having a low crystallinity. Herein, when the gasket 170 is heated, the crystalline region area of the insulating interposed part 171 attempts to transform into a non-crystalline region. The insulating interposed part 171 attempts to expand accordingly. However, the insertion part 175 and the insulating side wall 173 each having a lower crystallinity than the insulating interposed part 171 are conceived as having already expanded as compared with the insulating interposed part 171. Thus, they cannot absorb the expansion of the insulating interposed part 171. The force of the insulating interposed part 171 that attempts to expand acts on the insertion part 175 and the insulating side wall 173 but is not so large as to constrict the insertion part 175 and the side wall 173. Accordingly, the expansion of the insulating interposed part 171 is suppressed. The battery 100 of the embodiment can therefore prevent deterioration in crystallinity of the insulating interposed part 171 and maintain the crystallinity of the insulating interposed part 171 at a higher value than that of the insertion part 175 and the side wall 173. This enables the gasket 170 to maintain the good sealing performance. If the gasket 170 is configured such that the insertion part 175, the side wall 173, and the insulating interposed part 171 uniformly have a high crystallinity without providing a difference therebetween, the expansion of the insulating interposed part 171 caused in association with a rise of usage environmental temperature of the battery is absorbed by the insertion part 175 and the side wall 173. This deteriorates the crystallinity of the insulating interposed part 171, which cannot ensure good sealing performance by the gasket 170.

Figure 12:
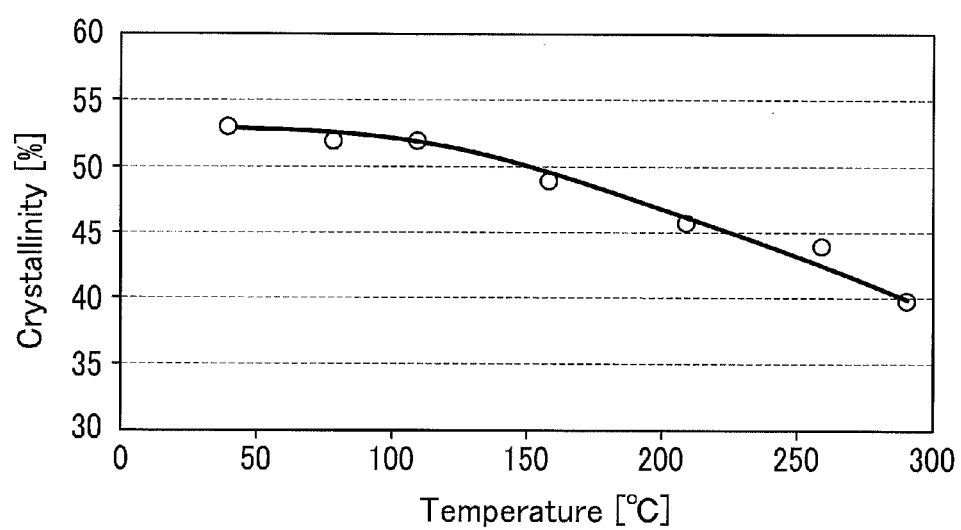
FIG. 12 is a graph showing a behavior of a crystallinity of the gasket decreasing as a temperature rises.

FIG. 12 shows a behavior of the crystallinity decreasing as the temperature rises. It is found from FIG. 12 that the crystallinity of the gasket decreases as the usage environmental temperature of the gasket increases. In particular, at high temperatures of 150° C. or higher, the crystallinity of the gasket noticeably decreases. Since the gasket 170 of the embodiment includes the insulating interposed part 171 between the insertion part 175 and the side wall 173, the gasket 170 can maintain the high crystallinity of the insulating interposed part 17 even when the usage environmental temperature rises as above 1. The crystallinity of the gasket in FIG. 12 was measured by XRD measurement using D8 ADVANCE manufactured by Bruker AXS Co.

In the battery 100 of the embodiment, the crystallinity of the insertion part 175 is lower than that of the insulating interposed part 171. Thus, the insertion part 175 is easily deformable as compared with the case where the insertion part 175 is made with the same crystallinity as the insulating interposed part 171. This enables a reduction in compression load needed to swage or rivet the electrode terminal member (the positive terminal member 130, the negative terminal member 140). Accordingly, the case lid 113 can be prevented from becoming deformed during riveting.

In the embodiment, the crystallinity of the insulating interposed part 171 of the gasket 170 is set higher than the crystallinities of the insertion part 175 and the side wall 173. As an alternative, the specific gravity of the insulating interposed part 171 of the gasket 170 may be set higher than the specific gravities of the insertion part 175 and the side wall 173. Also in this configuration, the electrolyte is hard to pass through the insulating interposed part 171 and, even under high temperature, the expansion of the insulating interposed part 171 is suppressed by the insertion part 175 and the side wall 173. This configuration can provide similar effects to those in the embodiment.

In the battery 100 of the embodiment, an upper part of the insertion part 175 is inserted together with the insert-through part 132 (142) through the through hole 113$h$ (113$k$) of the case lid 113. Accordingly, the through hole 113$h$ (113$k$) of the case lid 113 is closed by the insertion part 175 of the gasket 170, thereby enabling enhancing the hermeticity between the case lid 113 and the electrode terminal member (the positive terminal member 130, the negative terminal member 140).

In the battery 100 of the embodiment, the electrode terminal member (the positive terminal member 130, the negative terminal member 140) includes the seat part (the flat plate part) 131 (141) between which and the inner surface 113$b$ of the case lid 113 the insulating interposed part 171 is clamped. The insert-through part 132 (142) is provided extending vertically from the upper surface (the main surface) 131$f$ (141$f$) of the seat part 131 (141). The insulating side wall 173 surrounds the outer peripheral surface 131$g$ (141$g$) continuous with the upper surface 131$f$ (141$f$) of the seat part 131 (141). Accordingly, the gasket 170 can be fitted on the electrode terminal member (the positive terminal member 130, the negative terminal member 140) so that the side wall 173 of the gasket 170 surrounds the outer peripheral surface 131$g$ (141$g$) of the seat part 131 (141). This facilitates positioning of the gasket 170 with respect to the electrode terminal member (the positive terminal member 130, the negative terminal member 140) during assembling. Since the gasket 170 is assembled with the seat part 131 (141) having a nearly rectangular shape in plan view so that the side wall 173 surrounds the outer peripheral surface 131$g$ (141$g$) of the seat part, the gasket 170 can be prevented from causing positional displacement resulting from rotation around the insertion part 175.

In the battery 100 of the embodiment, the case lid 113 includes the protrusion 113$p$ protruding downward from the lower surface 113$b$ of the peripheral edge portion 113$c$ surrounding the through hole 113$h$ (113$k$). Thus, during riveting of the electrode terminal member (the positive terminal member 130, the negative terminal member 140), the protrusion 113$p$ presses a portion of the insulating interposed part 171 on a side close to the insertion part 175, thereby forming the highly compressed portion 171$p$. This highly compressed portion 171$p$ can ensure high sealing performance between the case lid 113 and the positive connecting member 135 (the negative connecting member 145).

The battery 100 of the embodiment can be mounted in any of vehicles that use electrical energy by the battery 100 for part or all of their power sources. In a case where the battery is mounted in a vehicle, it is conceivable that the electrolyte in the battery case 110 splatters toward the case lid 113 and the battery 100 is subjected to high temperature due to heat generation associated with running of the vehicle. However, even in such a usage environment, the battery 100 of the embodiment can appropriately prevent leakage of the electrolyte out of the battery 100 and entrance of water into the battery 100. It is to be noted that "vehicles" include, for example, electric vehicles, hybrid vehicles, plug-in hybrid vehicles, hybrid railway vehicles, fork lifts, electric wheelchairs, electric bicycles, and electric scooters.

The present invention is explained above in the embodiment but is not limited thereto. The invention may be embodied in other specific forms without departing from the essential characteristics thereof. For instance, the electrode terminal member (the positive terminal member 130, the negative terminal member 140) has only to include the insert-through part 132 (142) to be inserted in the through hole 113$h$ (113$k$) provided in the case lid 113 and does not necessarily include the positive connecting member 135 (the negative connecting member 145), the positive outer terminal member 137 (the negative outer terminal member 147), and the positive fastening member 139 (the negative fastening member 149).

The insertion part 175 (the inner edge portion) of the gasket 170 is not necessarily formed to be inserted in the through hole 113$h$ (113$k$) of the case lid 113. The side wall 173 (the outer edge portion) of the gasket 170 is not necessarily formed to surround the outer peripheral surface 131$g$ (141$g$) of the seat part 131 (141). The gasket (the sealing member) 170 is not necessarily configured to include the insertion part 175 (the inner edge portion) and the insulating side wall 173 (the outer edge portion) as long as the insulating interposed part 171 (the sealing part) is higher in crystallinity than other portions.

Although the battery in the above embodiment is exemplified as the lithium ion secondary battery 100, the invention is also applicable to other types of secondary batteries such as nickel-hydride secondary battery and nickel-cadmium battery. The above embodiment shows the battery 100 including the wound power generating element (the electrode body 150). As an alternative, the invention is applicable for example to a battery having a laminated power generating element. Although the above embodiment shows the battery 100 including the rectangular battery case 110, the invention can be applied for example to a battery including a cylindrical battery case.

In the above embodiment, the insulating interposed part 171 includes the highly compressed portion 171$p$, but the whole insulating interposed part 171 fulfills the sealing function and thus the whole insulating interposed part 171 is regarded as one example of the "sealing part". In a case where only the highly compressed portion 171$p$ of the insulating interposed part 171 provides the sealing function, only the highly compressed portion 171$p$ of the insulating interposed part 171 is one example of the "sealing part". In other words, of a part (the insulating interposed part 171) subjected to compression force when held between the electrode terminal member (the positive terminal member 130, the negative terminal member 140) and the inner surface 113$b$ of the case lid member 113, only a portion (the highly compressed portion 171*p*) subjected to larger compression force than other portions may be defined as the "sealing part" in claims.

REFERENCE SIGNS LIST

100 Battery
111 Case body (Case body member)
111*d* Opening
113 Case lid (Case lid member)
113*h*, 113*k* Through hole
130 Positive terminal member (Electrode terminal member)
131 Seat part (Flat plate part)
131*f* Upper surface (Main surface)
131*g* Outer peripheral surface
132 Insert-through part
140 Negative terminal member (Electrode terminal member)
141 Seat part (Flat plate part)
141*f* Upper surface (Main surface)
141*g* Outer peripheral surface
142 Insert-through hole
150 Electrode body (Power generating element)
170 First insulating member (Gasket, battery sealing member)
171 Insulating interposed part (Sealing part)
173 Insulating side wall (Outer edge part)
175 Insertion part (Inner edge part)
175 Insertion part (Inner edge part)
175*a* Insert-through hole

The invention claimed is:

1. A battery including: a power generating element; a case body member having an opening and enclosing the power generating element together with an electrolyte; a case lid member closing the opening of the case body member; an electrode terminal member having an insert-through part inserted in a through hole provided in the case lid member, the electrode terminal member being electrically connected to the power generating element; and
  a battery sealing member being made of synthetic resin and including a sealing part held between the electrode terminal member and an inner surface of the case lid member,
  wherein the sealing part has a crystallinity higher than a crystallinity of another portion of the sealing member,
  the case lid member includes a protrusion surrounding the through hole and cylindrically protruding from an inner surface, and
  the sealing part is formed with a highly compressed portion pressed between the protrusion and the electrode terminal member.

2. The battery according to claim 1, wherein the crystallinity of the sealing part is 40% or more.

3. The battery according to claim 1,
  wherein the battery sealing member includes: an insert-through hole in which the insert-through part will be inserted; an inner edge part located on an inner side close to the insert-through hole relative to the sealing part and formed to surround the insert-through hole; the sealing part surrounding the inner edge part; and an outer edge part located on an outer side opposite to the inner edge part relative to the sealing part and formed to surround the sealing part, and
  the sealing part is higher in crystallinity than the inner edge part and the outer edge part.

4. The battery according to claim 3, wherein the inner edge part includes at least a portion that will be inserted together with the insert-through part in the through hole of the case lid member.

5. The battery according to claim 3, wherein
  the sealing member including the electrode terminal member provided with a flat plate part between which and the inner surface of the case lid member the sealing part will be held, the insert-through part being extended vertically from a main surface of the flat plate part, and
  the outer edge part is configured to surround a peripheral surface of the flat plate part continuous with the main surface.

6. The battery according to claim 2, further including an insert-through hole in which the insert-through part will be inserted,
  wherein the battery sealing member includes: an inner edge part located on an inner side close to the insert-through hole relative to the sealing part and formed to surround the insert-through hole; the sealing part surrounding the inner edge part; and an outer edge part located on an outer side opposite to the inner edge part relative to the sealing part and formed to surround the sealing part, and
  the sealing part is higher in crystallinity than the inner edge part and the outer edge part.

7. The battery according to claim 6, wherein the inner edge part includes at least a portion that will be inserted together with the insert-through part in the through hole of the case lid member.

8. The battery according to claim 4, wherein
  the sealing member including the electrode terminal member provided with a flat plate part between which and the inner surface of the case lid member the sealing part will be held, the insert-through part being extended vertically from a main surface of the flat plate part, and
  the outer edge part is configured to surround a peripheral surface of the flat plate part continuous with the main surface.

9. The battery according to claim 6, wherein
  the sealing member including the electrode terminal member provided with a flat plate part between which and the inner surface of the case lid member the sealing part will be held, the insert-through part being extended vertically from a main surface of the flat plate part, and
  the outer edge part is configured to surround a peripheral surface of the flat plate part continuous with the main surface.

10. The battery according to claim 7, wherein
  the sealing member including the electrode terminal member provided with a flat plate part between which and the inner surface of the case lid member the sealing part will be held, the insert-through part being extended vertically from a main surface of the flat plate part, and
  the outer edge part is configured to surround a peripheral surface of the flat plate part continuous with the main surface.

* * * * *